US008622369B2

(12) United States Patent
Kania

(10) Patent No.: US 8,622,369 B2
(45) **Date of Patent: *Jan. 7, 2014**

(54) FLOOR JACK HAVING INTEGRATED TOOL KIT

(75) Inventor: Anthony Kania, Mesa, AZ (US)

(73) Assignee: Test Rite Products Corp., Ontario, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/195,162

(22) Filed: Aug. 1, 2011

(65) Prior Publication Data

US 2012/0187004 A1 Jul. 26, 2012

Related U.S. Application Data

(63) Continuation-in-part of application No. 12/841,881, filed on Jul. 22, 2010.

(60) Provisional application No. 61/302,075, filed on Feb. 5, 2010.

(51) Int. Cl.
*B62B 3/065* (2006.01)
*B23Q 3/00* (2006.01)

(52) U.S. Cl.
USPC ............................ 254/2 B; 206/378; 254/8 B

(58) Field of Classification Search
USPC ........ 254/2 B, 7 B, 8 R, 93 R, 120; 81/177.4, 81/490; 206/216, 372, 373, 374, 375, 376, 206/377, 378; 269/17
See application file for complete search history.

(56) References Cited

U.S. PATENT DOCUMENTS

| | | | | | |
|---|---|---|---|---|---|
| 1,721,756 | A | | 7/1929 | Walker | |
| 2,180,572 | A | * | 11/1939 | White | 206/375 |
| 2,789,788 | A | | 4/1957 | Wilson | |
| 4,018,421 | A | | 4/1977 | Tallman | |
| D274,668 | S | | 7/1984 | Eliasson | |
| 4,765,009 | A | | 8/1988 | Hung | |
| 4,811,440 | A | | 3/1989 | Scott | |
| 4,872,230 | A | | 10/1989 | Levine | |
| 5,056,661 | A | * | 10/1991 | Balzano | 206/372 |
| 5,131,628 | A | * | 7/1992 | Huang | 254/7 R |
| D332,337 | S | | 1/1993 | Wang | |
| 5,201,257 | A | | 4/1993 | Engel | |
| 5,433,127 | A | | 7/1995 | Messier | |
| 5,438,892 | A | * | 8/1995 | Bell | 81/120 |
| 5,450,928 | A | * | 9/1995 | Isogai | 187/205 |
| D398,730 | S | | 9/1998 | Lin | |
| 5,975,297 | A | * | 11/1999 | Kao | 206/378 |
| 5,992,826 | A | | 11/1999 | Simmonds | |
| D421,516 | S | | 3/2000 | Hung | |
| D423,750 | S | | 4/2000 | Hung | |
| 6,237,894 | B1 | | 5/2001 | Cotner et al. | |
| D452,597 | S | | 12/2001 | Hung | |
| D453,983 | S | | 2/2002 | Lin | |

(Continued)

*Primary Examiner* — Brian Glessner
*Assistant Examiner* — Joseph J Sadlon
(74) *Attorney, Agent, or Firm* — Tsircou Law, P.C.

(57) ABSTRACT

A floor jack is provided having an integrated tool kit. The floor jack includes a jack body and a tool kit assembly disposed on the jack body for housing tools. The tool kit includes a storage housing pivotally coupled to an exterior side of a sidewall of the jack body. The storage housing defining a plurality of storage locations configured to secure tools, such as a socket wrench and a plurality of sockets such that they are exposed and readily assessable for use.

19 Claims, 5 Drawing Sheets

(56) References Cited

U.S. PATENT DOCUMENTS

| | | | | |
|---|---|---|---|---|
| 6,357,724 | B1 | 3/2002 | Hung | |
| 6,375,160 | B1 | 4/2002 | Hung | |
| 6,505,816 | B1 | 1/2003 | Hung | |
| 6,637,908 | B1 | 10/2003 | Hung | |
| D485,412 | S | 1/2004 | Hung | |
| 6,789,785 | B2 * | 9/2004 | Hung | 254/8 B |
| 6,899,319 | B2 | 5/2005 | Hung | |
| 6,910,578 | B2 * | 6/2005 | Stern | 206/379 |
| 6,910,677 | B1 | 6/2005 | Miller et al. | |
| D513,954 | S | 1/2006 | Richards | |
| D514,768 | S | 2/2006 | Ji | |
| 7,055,652 | B1 * | 6/2006 | Williams | 182/129 |
| D531,377 | S | 10/2006 | Liu | |
| D540,504 | S | 4/2007 | Mathieson | |
| 7,207,548 | B1 | 4/2007 | Howe | |
| D544,674 | S | 6/2007 | Hsieh | |
| 7,334,774 | B1 | 2/2008 | Lin | |
| D571,072 | S | 6/2008 | Kong et al. | |
| D579,167 | S | 10/2008 | Lin | |
| D582,623 | S | 12/2008 | Qian et al. | |
| D590,121 | S | 4/2009 | Shen | |
| D590,569 | S | 4/2009 | Arzouman | |
| D590,570 | S | 4/2009 | Arzouman | |
| 7,588,341 | B2 | 9/2009 | Lin | |
| D604,025 | S | 11/2009 | Lin | |
| 8,448,921 | B2 * | 5/2013 | Hernandez | 254/88 |
| 2002/0139964 | A1 | 10/2002 | Hung | |
| 2003/0043581 | A1 | 3/2003 | Finnigan | |
| 2003/0102275 | A1 * | 6/2003 | Kao | 211/70.6 |
| 2003/0136951 | A1 | 7/2003 | Hung | |
| 2004/0129926 | A1 | 7/2004 | Hsu | |
| 2005/0023510 | A1 | 2/2005 | Liu | |
| 2007/0012587 | A1 * | 1/2007 | Wang | 206/379 |
| 2007/0284561 | A1 * | 12/2007 | Wang et al. | 254/8 B |
| 2008/0128429 | A1 | 6/2008 | Towery et al. | |
| 2008/0128670 | A1 * | 6/2008 | Bogert | 254/93 H |
| 2008/0137338 | A1 | 6/2008 | Lin | |
| 2009/0288974 | A1 * | 11/2009 | Pistor et al. | 206/377 |
| 2010/0001240 | A1 | 1/2010 | Lin | |
| 2011/0315572 | A1 * | 12/2011 | Vu et al. | 206/216 |

* cited by examiner

FLOOR JACK HAVING INTEGRATED TOOL KIT

CROSS REFERENCE TO RELATED APPLICATION

This application is a continuation in part of U.S. application Ser. No. 12/841,881, filed Jul. 22, 2010, which claims priority to U.S. APP. No. 61/302,075, filed Feb. 5, 2010, all of which are herein incorporated by reference.

FIELD OF THE INVENTION

The present invention relates generally to floor jacks and, more particularly, to floor jacks having a tool kit.

BACKGROUND OF THE INVENTION

A jack is a device for lifting a heavy object and has the properties of easy moving and operation, so the jack is widely used in various industries, and vehicle maintenance in particular. Therefore, almost each vehicle is prepared for a jack.

The underlining reason to lift a vehicle is enable a mechanic to inspect or fix components of the vehicle. To do so, tools are often required. Thus, the user must first raise the vehicle with the jack. Then, find the appropriate tools from a tool kit, carrying those tools underneath the vehicle. When a vehicle is in a remote location, the user must bring both the floor jack and separate tool kit.

SUMMARY OF THE INVENTION

Briefly, and in general terms, the invention provides a floor jack having integrated tool kit having a jack body and a tool kit assembly disposed on the jack body for housing tools. The tool kit assembly includes a storage housing configured to house a plurality of tools such as a socket wrench and a plurality of sockets such that they are exposed and readily assessable for use.

More specifically, by way of example and not limitation, the tool kit assembly is pivotally mounted to a first sidewall of the jack body. The storage housing defines a plurality of recesses configured each configured to receive a single wrench socket. The assembly can further include a plurality of wrench sockets. The storage housing is further configured to receive the socket wrench in a conforming recess via snap-fit configuration.

In a detailed aspect of an exemplary embodiment, the floor jack having integrated tool kit can include a first tool kit assembly mounted on a first side wall of the jack body and a second tool kit assembly mounted on a second side wall of the jack body. In such configurations, the first tool kit assembly can include metric-sized sockets, and the second tool kit assembly can include inch-sized (SAE) sockets.

In yet another detailed aspect of an exemplary embodiment, the tool kit assembly, (or assemblies) is configured to be attached to the sidewall of the jack body in a removable manner and is pivotally attached. In this manner, the assembly can pivot away from the sidewall to facilitate access to the tools. For example, the assembly can include attachments located a bottom portion of a tool housing that interfaces with attachments on the sidewall of the jack body.

The upper end of the tool kit assembly can include a deflectable portion configured to couple to the jack assembly to maintain the tool kit in an upright orientation. For example, the floor jack can include a handle pivotally attached to the jack body. The deflectable portion can couple to the pivot attachment of the handle.

For purposes of summarizing the invention and the advantages achieved over the prior art, certain advantages of the invention have been described herein. Of course, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment disclosed.

BRIEF DESCRIPTION OF THE DRAWINGS

Embodiments of the present invention will now be described, by way of example only, with reference to the following drawings in which.

DETAILED DESCRIPTION OF THE PREFERRED EMBODIMENTS

Figure 1:
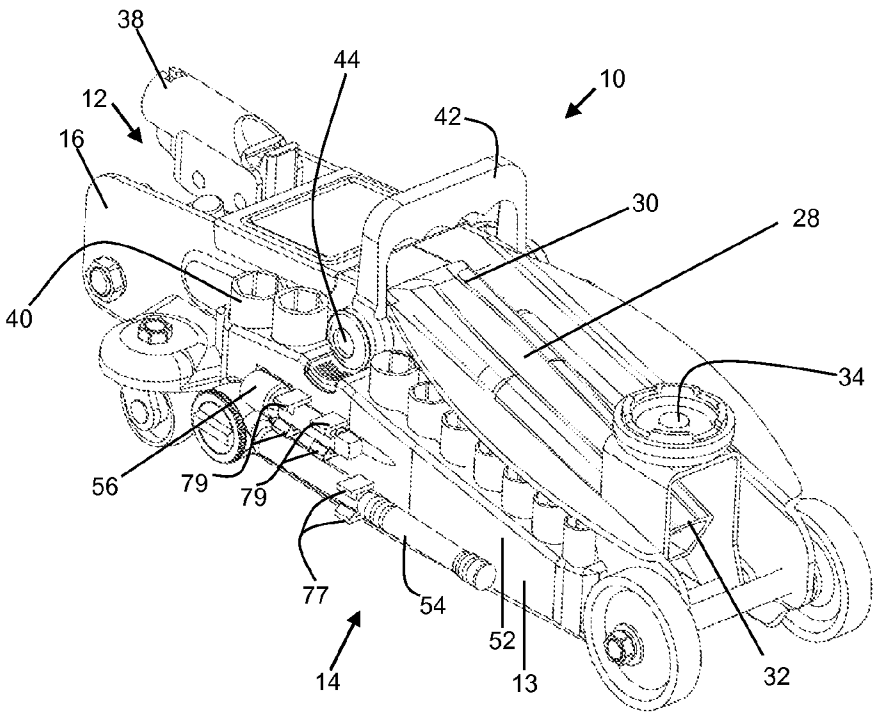
FIG. 1 is a front, right perspective view of a combined floor jack and tool kit in accordance with the invention, depicting a first tool assembly having a plurality of wrench sockets.
Figure 2:
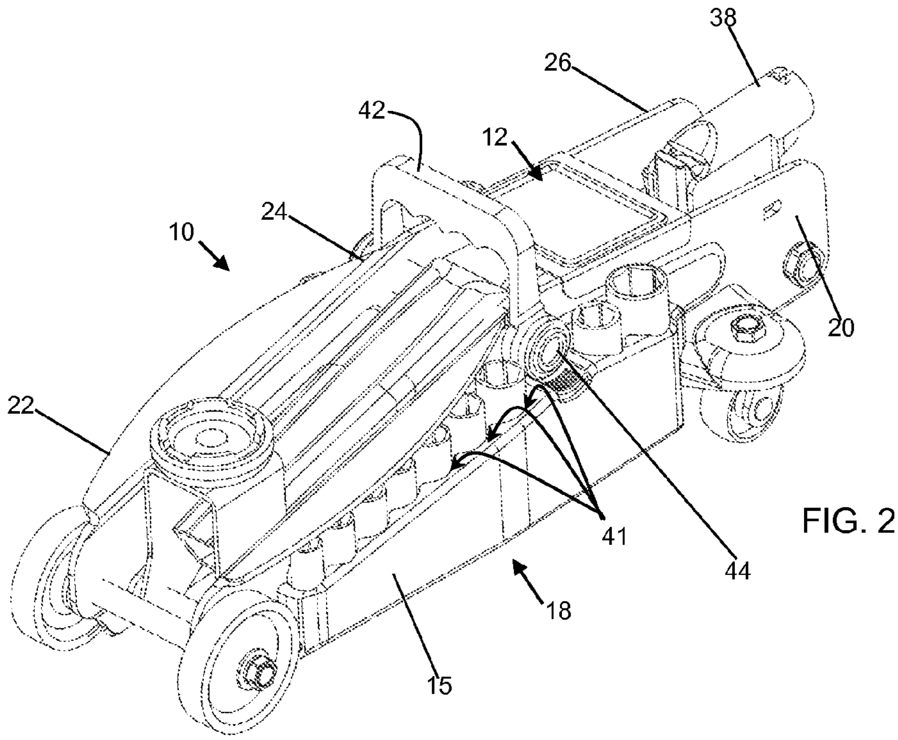
FIG. 2 is a front, left perspective view of the floor jack having integrated tool kit of FIG. 1, depicting a second tool assembly having a plurality of wrench sockets.

Referring now to the drawings, and particularly FIGS. 1 and 2, there is shown a floor jack having integrated tool kit 10. The assembly includes a jack body 12, a first tool assembly 14 disposed on a first sidewall 16 of the jack body, and a second tool assembly 18 disposed on a second sidewall 20 of the jack body.

The body 12 includes a front portion 22, an intermediate region 24, and an end portion 26. The body comprises first and second sidewalls 16, 20 spaced apart from each other. A lift arm 28 is coupled to the body. The lift arm has a first end 30 pivotally coupled to the intermediate region of the body and a second end 32 proximate to the front portion. The floor jack further includes a top plate 34 coupled to the second end of the lift arm. The top plate configured to engage a lifting location of an object to be lifted. In the exemplary embodiment, the top plate is configured to engage a lifting location of an automobile; however, in other embodiments the top plate can be configured in various other forms to lift other objects such as a motorcycle via, e.g., spaced apart parallel bars such as those commonly known in the art.

A hydraulic system of the floor jack is housed within the body and configured to raise the lift arm. The hydraulic system is operated by the driving head 38, which is pivotally coupled to the end portion 26 of the body. In use, an engaging portion of a driving lever (not shown) is inserted into an aperture of the driving head to operate a hydraulic system.

Figure 4:
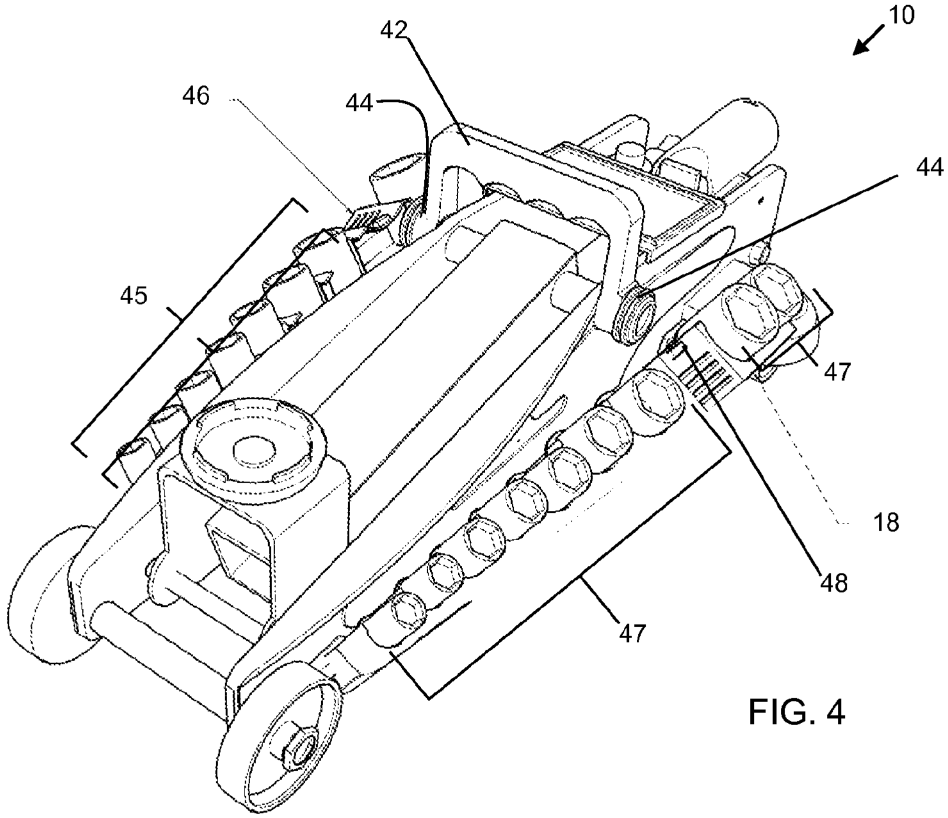
FIG. 4 is a front perspective view of the floor jack having integrated tool kit of FIG. 1, depicting the first and second tool kit assemblies in an angled configuration.

The tool assemblies 14, 18 house at least one wrench socket 40. In the exemplary embodiment, the tool assemblies each include a storage housing 13, 15 coupled a corresponding sidewall (16, 20) of the body. The first tool kit assembly includes metric-sized sockets 45 (FIG. 4), and the second tool kit assembly includes inch-sized (SAE) sockets 47 (FIG. 4). In this manner, a user has convenient access to wrench sockets commonly used. The storage bodies define a plurality of recesses (e.g., 41), each configured to receive a single wrench socket of a prescribed size. In the exemplary embodiment, recesses are disposed along an upper edge of the storage housings.

Figure 3:
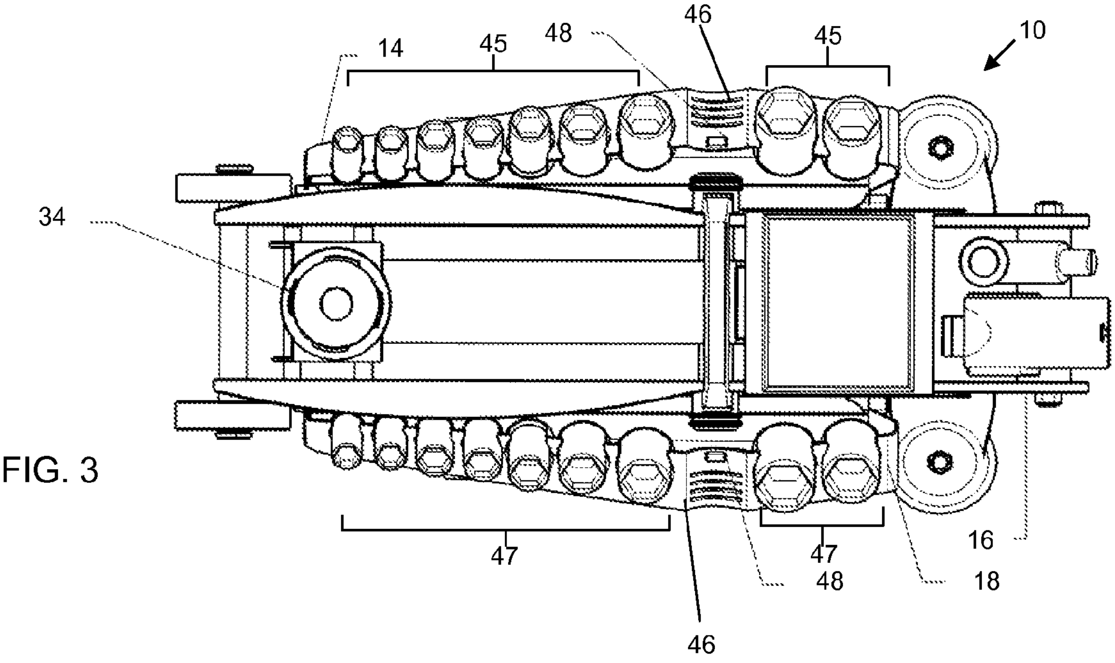
FIG. 3 is a top view of the floor jack having integrated tool kit of FIG. 1, depicting the first and second tool kit assemblies in an angled configuration.
Figure 5:
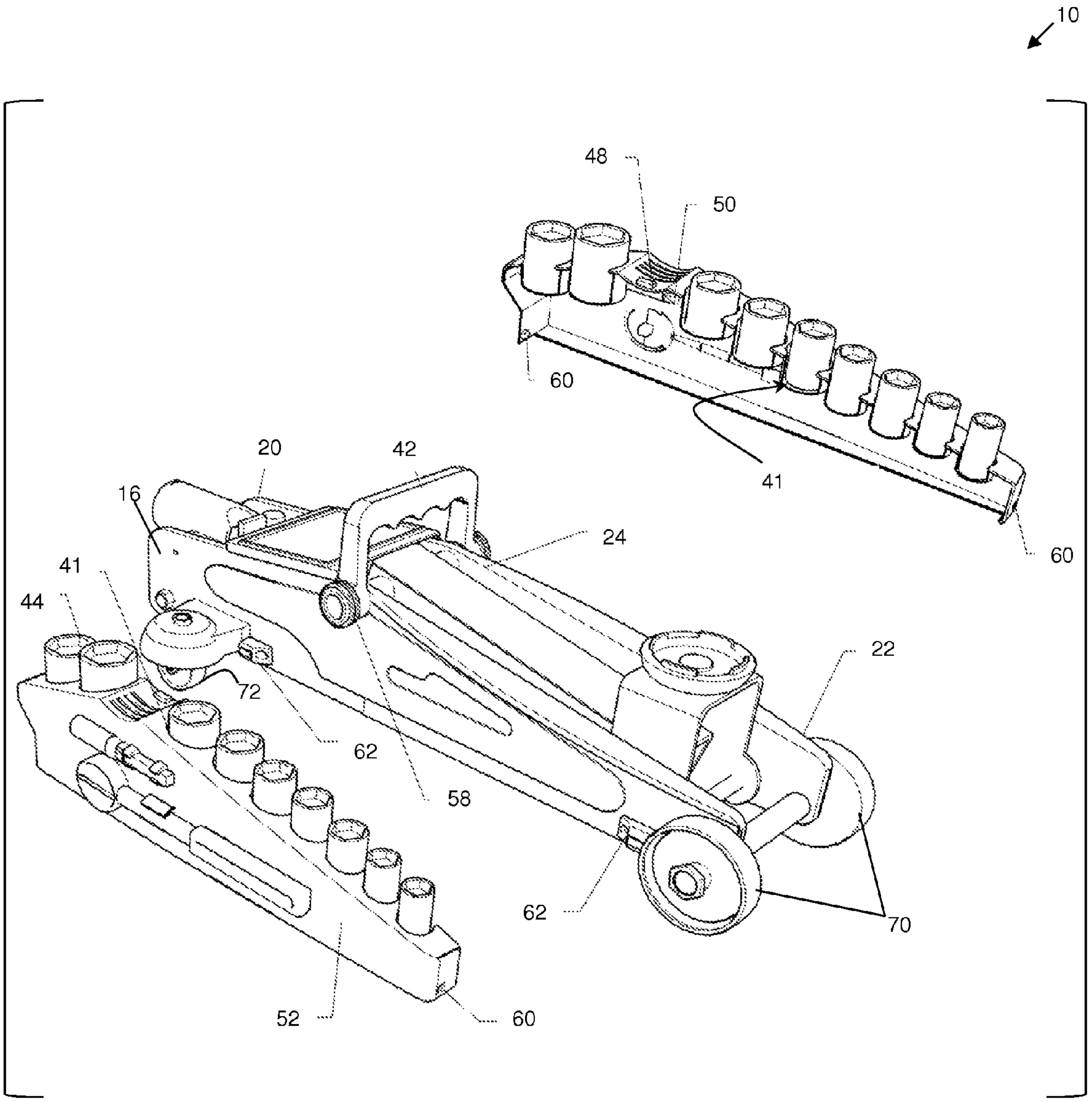
FIG. 5 is a perspective view of the floor jack having integrated tool kit of FIG. 1, depicting the first and second tool kit assemblies detached from the jack body.

With reference now to FIGS. 3-5, the floor jack 10 further includes a handle 42 attached to the sidewalls 16, 20 in the intermediate region 24 of the body via pivot attachments 44. The upper edges 46 of the storage bodies include deflectable portions 48 configured to engage the pivot attachments 44 in snap fit arrangement and a detachable manner to maintain the storage bodies in an upright configuration, which can be generally flush with the sidewalls. The deflectable portions are disposed in a curved portion 50 of the upper edge sized to conform to the pivot attachments. The curved portion is located between recesses 41 of the storage housing. The pivot attachments 44 define an annular lip 58 (FIG. 5) positioned to engage the deflectable portions 48 of the storage bodies 13, 15.

A front wall 52 of the storage housing 13 is configured to receive a plurality of tools, such as a wrench 54 and an extender 56. In the exemplary embodiment, the front wall includes a plurality of opposing arms 77, 79 configured to receive the tools in a snap-fit manner. In other embodiment, the storage housings can be configured to hold various other tools, e.g., screwdrivers, Allen wrenches, hex wrenches, and other hand tools known in the art. In other embodiments, various other configurations can be used for storing wrench sockets. For example, the storage housing can include posts configured to mate with wrench sockets.

The opposing sides of the storage housings define apertures 60 configured to mate with pivot posts 62 coupled to the sidewalls 16, 20 of the jack body, forming a pivot attachment for the storage bodies to the sidewalls. The pivot attachment is configure to confine the orientation of each storage housing in a prescribed range such as from a vertical orientation to an angled orientation of about 30 degrees off vertical (e.g., FIG. 6-8). In selected preferred embodiments, the terminal end of the angled orientation is between about 15 degrees to about 45 degrees from vertical.

As seen in FIG. 5, the storage bodies can be removed from the jack body. In this manner, a user can access the tools quickly without need of moving the floor jack, when needed.

The floor jack 10 further includes a pair of wheels 70 at the front portion 22 of the body, with an axle extending therebetween. Two caster wheels 72 are positioned in the end portion 26 of the body, attached to extensions from the sidewalls. The storage bodies 13, 15 are sized to be disposed between the front wheels 70 and the caster wheels 72.

Figure 6:
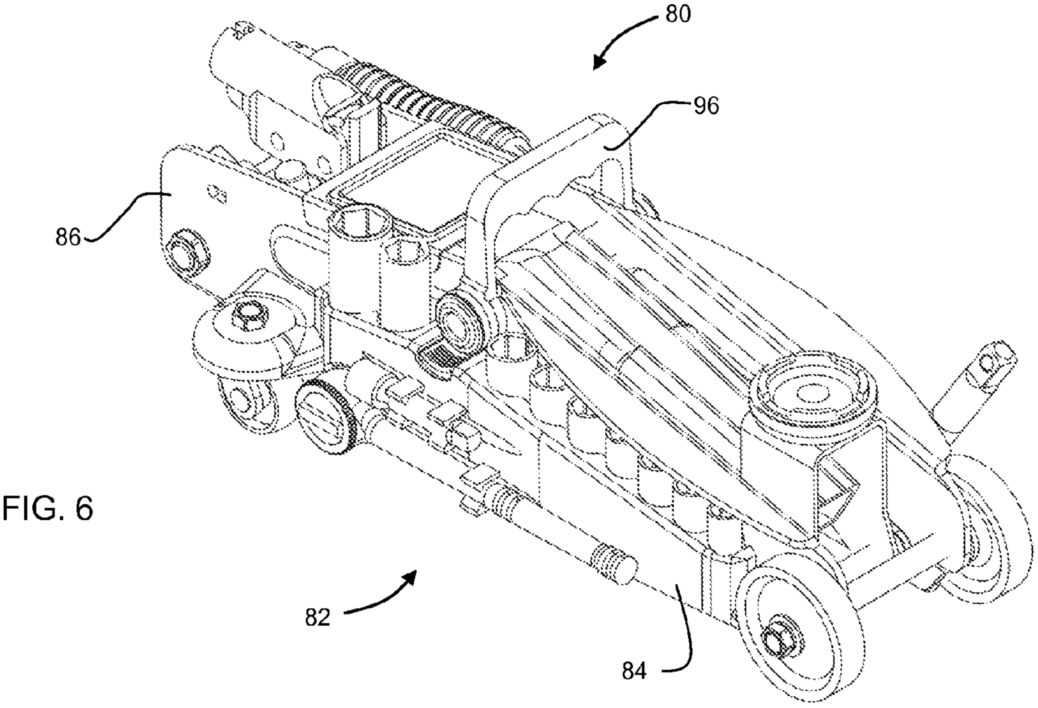
FIG. 6 is a front, right perspective view of a second embodiment of combined floor jack and tool kit in accordance with the invention.
Figure 7:
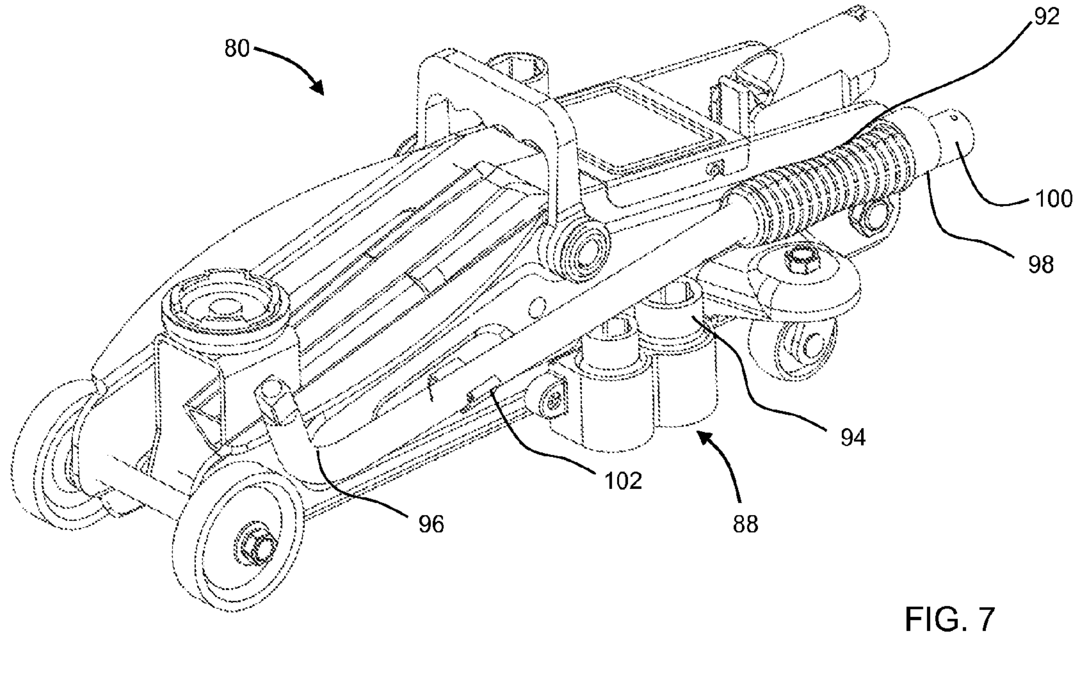
FIG. 7 is a front, left perspective view of the floor jack of FIG. 6.
Figure 8:
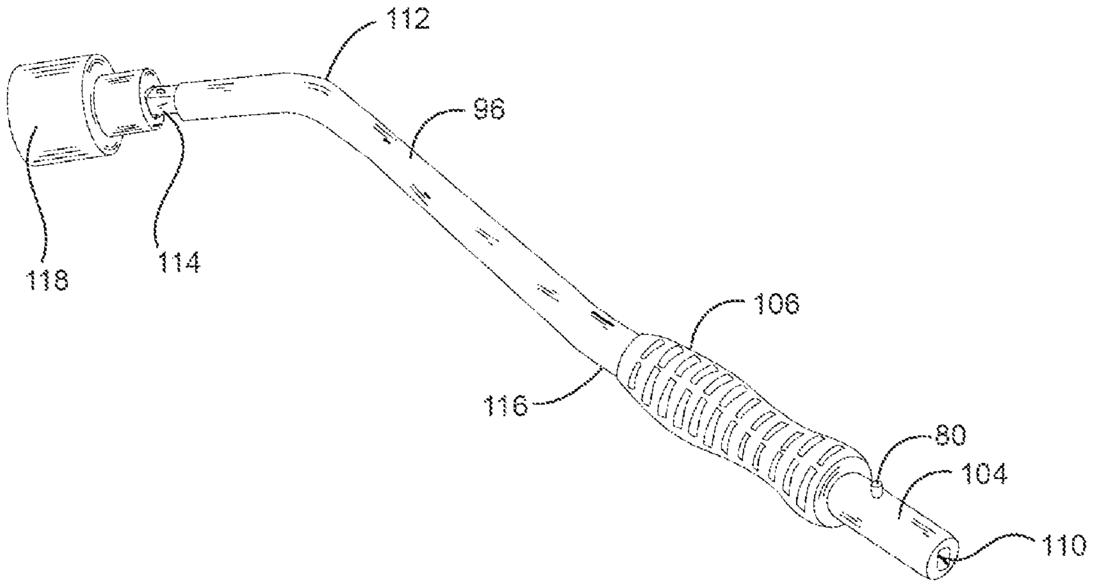
FIG. 8 is an elevational view of a driving lever and socket of FIG. 6.

With reference now to FIGS. 6-8, a floor jack assembly 80 includes a tool assembly 82 (similar to tool assemblies 14, 18 discussed above). The tool assembly includes a storage housing 84 coupled a first sidewall 86 of the jack body. A socket storage assembly 88 and a lever storage assembly are disposed on the second sidewall 92 of the jack.

The socket storage assembly 88 houses at least one wrench socket 94. The storage housing defines a plurality of recesses, each configured to receive a single wrench socket. Preferably, the socket storage is configured to house wrench sockets 118 useable with lug nuts for vehicle tires. In this manner, a user has convenient access to wrench sockets commonly used. In other embodiments, various other configurations can be used for storing wrench sockets. For example, the socket storage assembly can include posts configured to mate with wrench sockets.

The lever storage assembly includes a plurality of holders (98, 102) spaced apart along the second sidewall 92 of the body to secure a driving lever 96. In use, the driving lever is received by the holders such the lever is longitudinally aligned along the second sidewall of the jack body. The holders are configured to hold the lever securely. In the exemplary embodiment, a first holder 98 disposed adjacent to the front end. The first holder includes upper and lower ends attached to the sidewall defining an aperture for receiving an end of the lever. The lever is inserted axially into the aperture. A second holder 100 is disposed adjacent to the back end of the body. A second holder 102 is generally u-shaped defining an upper opening for receiving the lever. In the exemplary embodiment, the second holder is formed to deflect upon insertion of the lever through the opening to maintain the lever securely.

The driving lever 96 further includes an engaging portion 104, which extends beyond a grip 106 towards a second end of the lever body. The engaging portion is configured to mate with a driving head of the car jack to operate the lifting arm. Towards that end, the engaging portion includes a locating pin 108 perpendicularly extended from the periphery. A retaining hole 110 is axially formed at the second end.

With reference now to FIG. 8, the elongated tubular body of the driving lever 96 has a first bend 112 proximate to yet from spaced from coupling tip 114, and a second bend 116 proximate to the second end and the grip 106. The first bend has an angle preferably between about 20 degrees and 90 degrees. The second bend has an angle between about 0 degrees and 30 degrees. Preferably, the first and the second bends are in opposite directions such that the body has a slight s-shape. In other words, in a prescribed orientation, the coupling tip projects downward relative to a longitudinal axis of the intermediate region, and the engaging region projects upwards relative to a longitudinal axis of the intermediate region. In other embodiments, the second bend can be excluded entirely.

A wrench socket 118 is attached to the coupling tip 114 of the driving lever 96 such that the driving lever serves as a spanner for the lug wrench. The grip is sufficiently spaced apart from the wrench socket allowing a user to comfortably torque the lug wrench. In addition, the first and second bends of the lever body further facilitate torquing of the lug wrench as well as a facilitating ample clearance of adjacent structure commonly found on vehicles.

Although the invention has been disclosed in detail with reference only to the exemplary embodiments, those skilled in the art will appreciate that various other embodiments can be provided without departing from the scope of the invention. Accordingly, the invention is defined only by the claims set forth below.

What is claimed is:

1. A floor jack, comprising:

a body having a front portion, an intermediate region, and an end portion, the body further having a first sidewall and a second sidewall spaced apart from each other;

a lifting assembly having a lift arm having a first end pivotally coupled to the intermediate region of the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm;

a driving lever having an elongated body with a first end and a second end, the driving lever having a coupling tip at the first end configured to mate with a wrench socket;

a first tool assembly having a storage housing coupled to the first sidewall, the storage housing having an upper portion, a lower portion, and a front wall, the upper portion defining a plurality of storage locations configured to secure tools, and a plurality of tools securely received in the plurality of storage locations, wherein an upper edge of the storage housing includes a deflectable portion that engages a pivot attachment of a handle of the body to maintain the storage housing in an upright configuration;

a socket storage assembly disposed on the second sidewall that houses a wrench socket configured to mate with the coupling tip of the driving lever; and a lever storage assembly disposed on the second sidewall that secures the driving lever along the second sidewall of the body.

2. The floor jack as defined in claim 1, wherein the plurality of storage locations are disposed along an upper edge of the storage housing and each storage location is configured to receive a single wrench socket of a prescribed size.

3. The floor jack as defined in claim 2, wherein the storage housing is pivotally attached to a sidewall of the body.

4. The floor jack as defined in claim 1, wherein the deflectable portion is disposed in a curved portion of the upper edge sized to conform to the pivot attachment.

5. The floor jack as defined in claim 1, wherein the lever storage assembly comprises a plurality of holders spaced apart along the second sidewall of the body.

6. The floor jack as defined in claim 5, wherein a holder of the plurality of holders is disposed above the socket storage assembly.

7. A floor jack, comprising:

a body having a front portion, an intermediate region, and an end portion, the body further having a first sidewall and a second sidewall spaced apart from each other, the first sidewall having a forward attachment and an aft attachment spaced apart from each other;

a lifting assembly having a lift arm having a first end pivotally coupled to the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm;

a driving lever having an elongated body with a first end and a second end, the driving lever having a coupling tip at the first end configured to mate with a wrench socket;

a first tool assembly having a storage housing defining a plurality of storage locations configured to secure tools, the storage housing including an upper edge having a deflectable portion positioned to engage a lip of the body in a snap-fit arrangement and a detachable manner while the storage housing is in an upright orientation relative to the first sidewall, a forward end that mates with the forward attachment of the body proximate to a lower edge of the storage housing, and an aft end that mates the aft attachment of the body proximate to a lower edge of the storage housing;

a socket storage assembly disposed on the second sidewall that houses a wrench socket configured to mate with the coupling tip of the driving lever; and a lever storage assembly disposed on the second sidewall that secures the driving lever along the second sidewall of the body.

8. The floor jack as defined in claim 7, wherein the lever storage assembly comprises:

a first holder coupled to the second sidewall proximate to a front end of the body, and a second holder coupled to the second sidewall disposed above the socket storage assembly.

9. The floor jack as defined in claim 7, wherein the plurality of storage locations are disposed along an upper edge of the storage housing and each storage location is configured to receive a single wrench socket of a prescribed size.

10. The floor jack as defined in claim 7, wherein the driving lever having an intermediate region disposed between the first end and the second end, the driving lever further having a first bend disposed between the first end and the intermediate region and a second bend disposed between the intermediate region and the second end, the first bend and the second bend are in opposite directions.

11. The floor jack as defined in claim 7, wherein the driving lever includes a grip disposed about the elongated body proximate to the second end configured to be held by as user when the driving lever is used as a spanner of a lug wrench, in which a wrench socket is disposed on the coupling tip.

12. The floor jack as defined in claim 7, wherein the grip of the driving lever is positioned adjacent to a holder of the lever storage assembly.

13. A floor jack, comprising:

a body having a front portion, an intermediate region, and an end portion, the body further having a pair of sidewalls spaced apart from each other, a first sidewall of the pair of sidewalls having a forward pivot attachment and an aft pivot attachment spaced apart from each other;

a lifting assembly having a lift arm having a first end pivotally coupled to the body and a second end proximate to the front portion, a top plate coupled to the second end of the lift arm, the top plate configured to engage a lifting location of an object to be lifted, and a driving head pivotally coupled to the end portion of the body to operate a hydraulic system housed within the body and configured to raise the lift arm;

a driving lever having an elongated body with a first end and a second end, the driving lever having a coupling tip at the first end configured to mate with a wrench socket, the driving lever having an intermediate region disposed between the first end and the second end, the driving lever further having a first bend disposed between the first end and the intermediate region and a second bend disposed between the intermediate region and the second end, the first bend and the second bend are in opposite directions;

a first tool assembly having a storage housing defining a plurality of storage locations configured to secure tools, the storage housing including an upper edge having a deflectable portion positioned to engage a lip of the body in a snap-fit arrangement and a detachable manner while the storage housing is in an upright orientation relative to the first sidewall, a forward end that mates with the forward pivot attachment of the body in a pivotal mount arrangement proximate to a lower edge of the storage location, and an aft end that mates the aft pivot attachment of the body in a pivotal mount arrangement proximate to a lower edge of the storage location, such that the forward pivot attachment and the aft pivot attachment cooperatively enable the storage housing to pivot away from the sidewall;

a lever storage assembly disposed on the second sidewall that secures the driving lever along the second sidewall of the body, the lever storage assembly includes a first holder coupled to the second sidewall proximate to a front end of the body, and a second holder coupled to the second sidewall disposed above the socket storage assembly; and a socket storage assembly disposed on the second sidewall that houses a wrench socket configured to mate with the coupling tip of the driving lever.

14. The floor jack as defined in claim 13, wherein the driving lever includes a grip disposed about the elongated body proximate to the second end configured to be held by as user when the driving lever is used as a spanner of a lug wrench, in which a wrench socket is disposed on the coupling tip.

15. The floor jack as defined in claim 14, wherein the grip of the driving lever is positioned adjacent to the first holder when stored by the lever storage assembly.

16. The floor jack as defined in claim 13, wherein the plurality of storage locations are disposed along an upper edge of the storage housing and each storage location is configured to receive a single wrench socket of a prescribed size.

17. The floor jack as defined in claim 13, wherein the deflectable portion that engages a pivot attachment of a handle of the body.

18. The floor jack as defined in claim 13, wherein the deflectable portion is disposed in a curved portion of the upper edge sized to conform to the pivot attachment.

19. The floor jack as defined in claim 13, wherein each storage location of the plurality of storage locations is configured to receive a single wrench socket of a prescribed size.

* * * * *